United States Patent [19]

Kobori et al.

[11] Patent Number: 5,147,018
[45] Date of Patent: Sep. 15, 1992

[54] CYLINDER LOCK DEVICE FOR USE IN STRUCTURE

[75] Inventors: Takuji Kobori; Koji Ishii; Motoichi Takahashi; Junichi Hirai; Yoshinori Adachi; Naoki Niwa; Shigeru Ariki, all of Tokyo; Toshiaki Kamei; Takeharu Shizume, both of Kangawa, all of Japan

[73] Assignees: Kajima Corporation; Kayaba Kogyo Kabushikikaisha, both of Tokyo, Japan

[21] Appl. No.: 845,497

[22] Filed: Feb. 27, 1992

Related U.S. Application Data

[63] Continuation of Ser. No. 487,403, Mar. 2, 1990, abandoned.

[30] Foreign Application Priority Data

| Mar. 2, 1989 | [JP] | Japan | 1-24243[U] |
| Mar. 3, 1989 | [JP] | Japan | 1-51574 |
| Feb. 19, 1990 | [JP] | Japan | 2-37992 |

[51] Int. Cl.⁵ .............................................. F16F 9/32
[52] U.S. Cl. .................... 88/300; 52/167 CB; 188/312; 188/313; 188/321.11; 188/322.13; 248/200; 267/64.12
[58] Field of Search .............. 188/299, 300, 312, 313, 188/314, 318, 322.12, 322.13, 322.14, 322.19, 321.11; 267/64.12; 16/51, 52; 248/200; 52/167 C B

[56] References Cited

U.S. PATENT DOCUMENTS

| 2,838,140 | 6/1958 | Rasmusson et al. | 188/313 |
| 3,286,797 | 11/1966 | Leibfritz et al. | 188/300 |
| 3,407,909 | 10/1968 | Seckerson et al. | 188/300 |
| 3,418,768 | 12/1968 | Cardan | 52/167 C B |
| 3,465,851 | 9/1969 | Callegari et al. | 188/313 X |
| 3,638,885 | 2/1972 | Reed | 188/312 X |
| 4,236,613 | 11/1980 | Lely | 188/312 X |
| 4,468,739 | 8/1984 | Woods et al. | 188/299 X |
| 4,786,034 | 11/1988 | Heess et al. | 188/312 X |
| 4,910,929 | 3/1990 | Scholl | 52/167 C B |
| 5,065,552 | 11/1991 | Kobori et al. | 52/167 C B |

FOREIGN PATENT DOCUMENTS

| 1055057 | 2/1954 | France | 188/313 |
| 151439 | 8/1985 | Japan | 188/312 |
| 1249230 | 8/1986 | U.S.S.R. | 188/322.13 |
| 1336868 | 11/1973 | United Kingdom | 188/314 |

Primary Examiner—George E. A. Halvosa
Attorney, Agent, or Firm—James H. Tilberry

[57] ABSTRACT

A hydraulically-operated piston device installed between the frame of a structure and a vibration-resisting element provided separately from the frame varies the rigidity of the frame by changing the condition of connection between the frame and the vibration-resisting element. A valve controls the operation of the piston device and can be adjusted to change the coefficient of damping of the piston device. To obtain maximum rigidity of the frame, the piston is hydraulically locked in place. For maximum flexiblity of the frame, the piston can be hydraulically released from a locked position to move freely. Hydraulic resistance to movement of the piston can be graduated by metering the flow of oil into and out of the piston device. The coefficient of damping is a function of the metered flow of hydraulic fluid in the piston device.

16 Claims, 9 Drawing Sheets

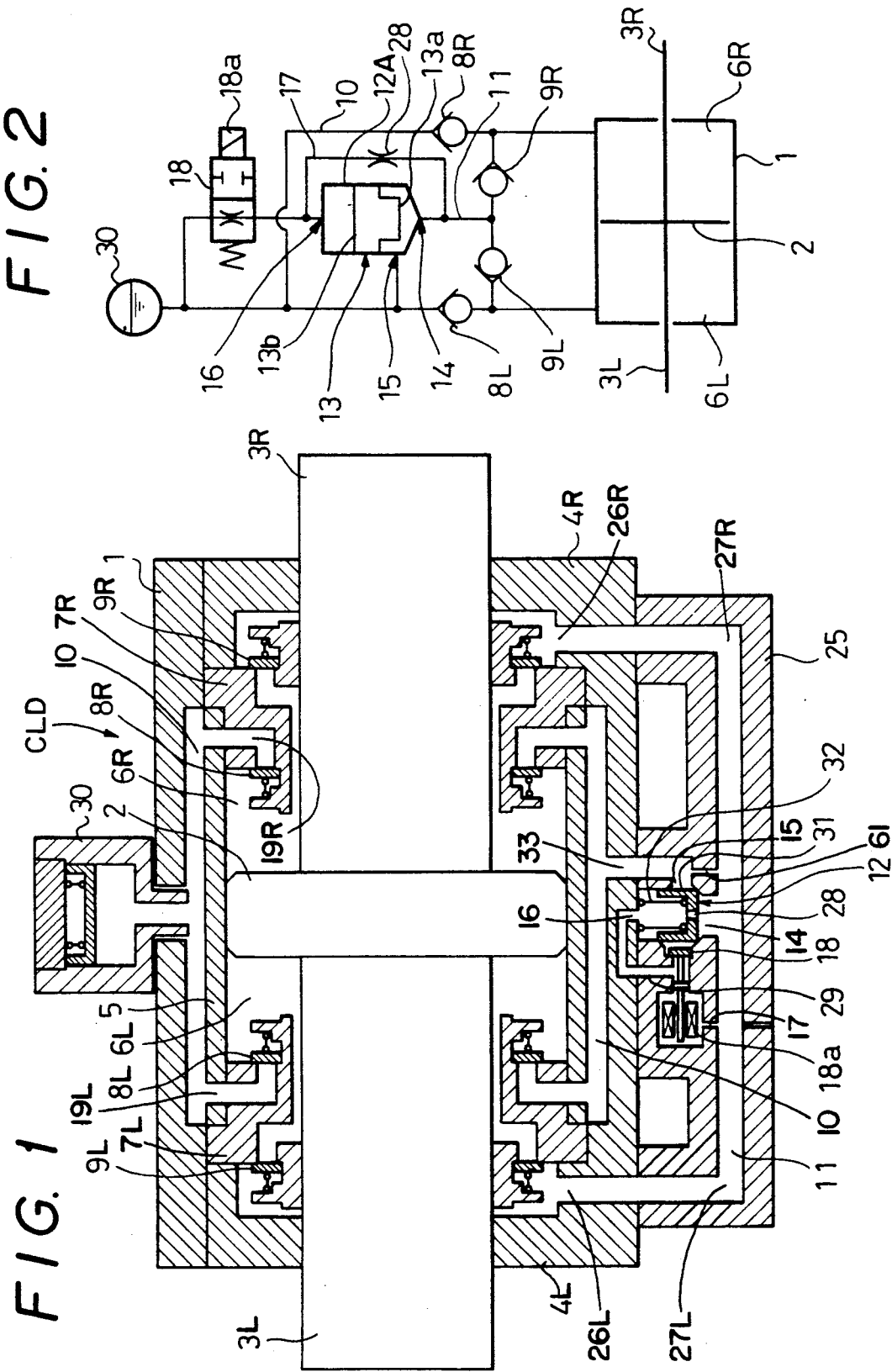

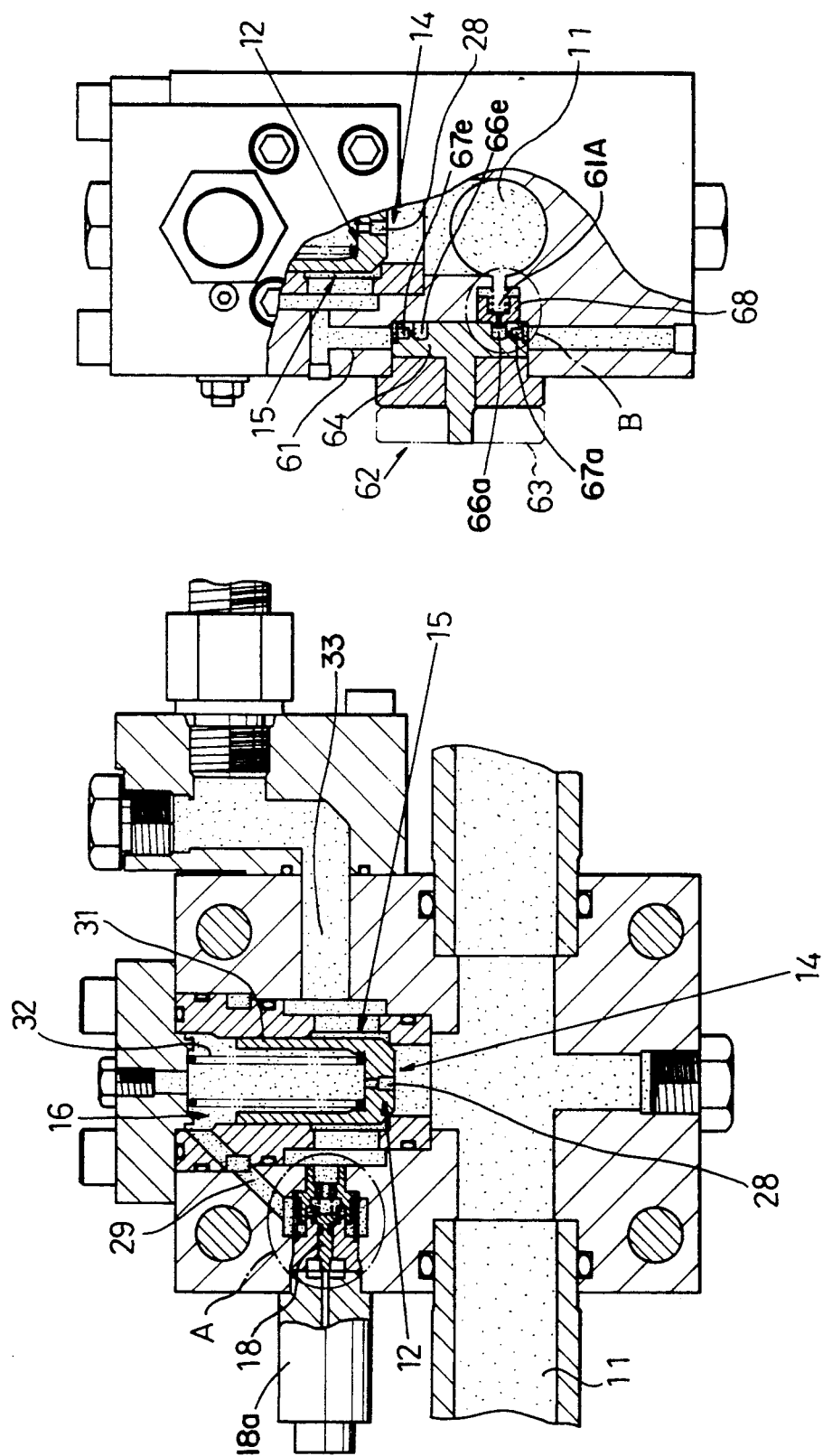

CYLINDER LOCK DEVICE FOR USE IN STRUCTURE

This is a continuation of application Ser. No. 07/487,403, filed Mar. 2, 1990, now abandoned.

BACKGROUND OF THE INVENTION

1. Field of the Invention

This invention relates in general to devices to protect building structures from seismic shock, and, in particular, the field of invention relates to devices installed between the frames of structures and vibration-resisting elements provided separately from the frames. The invention also relates to such devices which may be utilized to protect structures from industrially induced vibrations.

2. Description of the Prior Art

When there is a vibration source such as a motor and/or a machine tool in a building, a rubber vibration isolator is generally disposed between the vibration source and the floor to prevent transmission of vibration to the building. However, in the case where the frequency of the vibration source is close to the natural period of the building, the building is liable to resonate. Further, in the case where the vibration source produces rapid vibration, it is difficult for a conventional vibration-isolating mechanism to stop the vibration of the building.

As shown in FIG. 17, when there is a vibration source V such as a motor and/or a machine tool on a certain floor F in the building, a device D may be installed between a beam B and a vibration-resisting element R, capable of resisting the vibration caused by the vibration source V. The device D may be turned on or off as required to thereby control the resonance of the frame relative to the vibration source V. Such a device provides only a limited range of protection to the building frame since it has only two functioning modes, on or off.

SUMMARY OF THE INVENTION

As shown in FIG. 1, a cylinder lock device CLD according to the present invention has oil pressure chambers 6L and 6R provided on opposite sides of a piston 2 of a double-rod type in a cylinder body 1, and pressurized oil in each of the pressure chambers 6L and 6R is prevented from flowing, or is permitted to flow, by a valve 12. When the valve 12 is closed, the piston 2 is held stationary. When the valve 12 is open, piston 2 is movable to the left or to the right. Bypass passage 61, provided to the right of valve 12, may be metered or closed as required by valve means 62, FIG. 9, which selectively provides eight different orifice settings, from fully closed, 67a, to fully open, 67h, FIG. 15. By selectively metering the flow of oil through bypass passage 61, eight different coefficients of damping are obtainable.

The oil pressure chambers 6L and 6R are respectively provided with left and right outflow blocking check valves 8L and 8R for blocking the outflow of pressurized oil from the respective oil pressure chambers 6L and 6R. Left and right inflow blocking check valves 9L and 9R are for blocking the inflow of pressurized oil into the respective oil pressure chambers 6L and 6R. The left and right outflow blocking check valves 8L and 8R are connected to each other through an inflow passage 10 provided along the cylinder body 1, while the left and right inflow blocking check valves 9L and 9R are connected to each other through an outflow passage 11 provided along the cylinder body 1. The inflow passage 10 and the outflow passage 11 are selectively connected to each other through changeover valve 12.

Further, the changeover valve 12 has a valve body provided at one end with an inlet port 14 and an outlet port 15, and at the other end with a back pressure port 16. The inlet port 14 and the back pressure port 16 are connected to each other, and a shut-off valve 18 capable of blocking the outflow of pressurized oil is provided at the side of the back pressure port 16, so that a large quantity of pressurized oil is permitted to flow at high speed or is shut off from flowing.

Changeover valve 12 comprises a cartridge 31 having a throttle 28. Cartridge 31 is biased into a closed position by a spring 32 and by a biasing back pressure. FIGS. 2 and 16 diagrammatically illustrate the hydraulic circuit utilized in FIG. 1, except that a piston type changeover valve 12A is shown in FIGS. 2 and 16 having small surface areas 13a and large surface areas 13b whereby valve closing is accomplished by the differential in areas 13a and 13b.

In order to mount the cylinder lock device shown in FIG. 1 in a compact mounting space, the cylinder lock device is compactly designed. For instance, tube 5 is located concentrically within the cylinder body 1, and the inflow passage 10 is concentrically positioned between the inside of the cylinder body 1 and the outer periphery of the tube 5. In this case, the left and right check valves 8L, 8R and 9L, 9R are respectively located on the opposite sides of the tube 5 and within the confines delimited by end covers 4L and 4R. The outflow passage 11 is immediately adjacent and parallel to the exterior of the cylinder body 1. Either the inflow passage 10 or the outflow passage 11 may be provided with an accumulator in order to compensate for volume change due to compression of oil and temperature change. As shown in FIG. 1, an accumulator 30 is connected to inflow passage 10.

The cylinder lock device of the present invention is of a double rod cylinder system and includes the cylinder body 1 provided with two oil passages 10 and 11, the left and right check valves, 8L, 8R and 9L, 9R, and the changeover valve 12, so that the distance of movement of oil may be shortened and large passage areas may be obtained to reduce flow resistance. Accordingly, a large quantity of pressurized oil is permitted to flow at high speed or to be instantaneously shut off from flowing. Also, the cylinder lock device of the present invention uses a back pressure type changeover valve, so that instantaneous opening and closing operations are carried out to quicken response speed of the cylinder lock device CLD.

Next will be explained the operating modes of the hydraulic circuit diagram of FIG. 2.

(1) Free condition I (See FIG. 3)

The shut-off valve 18 is open, and the pressurized oil in the oil pressure chamber 6L flows through the check valve 9L and the outflow passage 11 in response to the leftward movement of the piston 2 to thereby push up the piston 13 of the changeover valve 12, thereby opening inlet port 14 and outlet port 15. Since the check valves 8L and 9R are closed by the pressurized oil, the pressurized oil flows from the changeover valve 12 through the inflow passage 10 and the check valve 8R. Therefore, the pressurized oil flows from the oil pressure chamber 6L to the oil pressure chamber 6R, so that the piston 2 moves to the left when an external force is exerted axially against piston rod 3R. The inlet port 14 and the outlet port 15 are instantaneously communicated to each other in response to the movement of the piston 13 to thereby permit a large quantity of pressurized oil to flow at high speed.

(2) Free condition II (See FIG. 4)

The shut-off valve 18 is open, and the pressurized oil in the oil pressure chamber 6R flows through the check valve 9R and the outflow passage 11 in response to the rightward movement of the piston 2 to thereby push up the piston 13, while at the same time the check valves 8R and 9L are closed by the oil pressure in the system caused by movement of piston 2 to the right. Thereafter, the pressurized oil flows through the inflow passage 10, the check valve 8L, and into oil pressure chamber 6L.

The right and left outflow blocking check valves 8L and 9R are so disposed that the pressurized oil flowing out of either oil chamber 6L or 6R is sure to flow into the inlet port 14 of the changeover valve 12.

(3) Locked condition (See FIG. 5)

The shut-off valve 18 is closed. Leftward external force is exerted on the piston 2 when the shut-off valve 18 is closed, and oil pressure is increased at the changeover valve 12. However, pressurized oil is applied through the bypass passage 17 to the large-area portion 13b of the valve, and also shut-off valve 18 blocks outflow of pressurized oil from valve 12, so that oil pressure force on the side of the large-area portion 13b of the piston 13 exceeds pressure on the small-area portion 13a thereof, so that the piston 13 is hydraulically locked in a stationary closed position when valve 18 is closed.

FIGS. 6 and 7 show the transition from the free condition (see FIG. 6) to the locked condition (see FIG. 7) of the cylinder lock device, wherein the bypass passage 17 is filled with pressurized oil to transmit pressure to instantaneously close valve 12. Since the piston 13 is operated due to the pressure-receiving area differential, the changeover valve 12 is easily closed.

Referring to the mounting of the cylinder lock device of the present invention to the inside of a structure, the body of the cylinder lock device is attached to either the frame of the structure or a vibration-resisting element provided separately from the frame. The opposite ends of the piston rod of the cylinder lock device are respectively brought into contact with a pair of brackets provided on either the frame or the vibration-resisting element, so as to be perpendicular to the axis of the piston rod, whereby the lateral, vertical, and/or centrifugal deformation of the frame is absorbed by the vibration-resisting element. Each of the opposite ends of the piston rod is formed into a spherical surface, with the center of the cylinder lock device body as the center of curvature to maintain working contact with the pair of brackets during distortion of the frame. To assist in maintaining contact between the opposite ends of the piston rod and the pair of brackets, each bracket is provided with a spherical seat comprised of low-friction material to permit smooth sliding, low-friction movement between the piston ends and the brackets when distortion of the frame occurs due to vibrational forces.

The cylinder lock device of the present invention is installed in the frame of the building as noted above to vary the rigidity of the frame, so that the rigidity and the damping property of the building may be varied in response to seismic or other destructive vibrations.

OBJECTS OF THE INVENTION

It is an object of the present invention to provide a cylinder lock device capable of providing on/off operations satisfactorily by permitting the flow of a large quantity of pressurized oil at high speed or by instantaneously shutting off the flow.

Another object of the present invention is to provide a cylinder lock device which attenuates the transmission of harmful vibration to a structure with relatively compact hydraulic means.

A further object of the present invention is to provide a cylinder lock device which not only can be turned on and off, but which also provides a series of damping coefficients ranging between the damping coefficients on the on and off modes of the device.

A still further object of the present invention is to provide a cylinder lock device that is both reliable and easily maintained.

A yet further object of the present invention is to provide a mounting structure of the cylinder lock device which is capable of smoothly following the deformation and vibration of a frame, and which is also easy to mount on the frame of the structure.

BRIEF DESCRIPTION OF THE DRAWINGS

FIG. 1 is a sectional schematic view of the inventive cylinder lock device;

FIG. 2 is a schematic hydraulic circuit diagram of the cylinder lock device of FIG. 1;

FIG. 10 is a fragmentary view showing specific structure of the changeover valve portion of the present invention;

FIG. 11 is an elevational side view, partially in section, showing a portion of the dialable orifices provided in the bypass of the changeover valve;

DETAILED DESCRIPTION OF THE PREFERRED EMBODIMENTS

Hereinafter will be explained preferred embodiments of a cylinder lock device CLD according to the present invention.

Figure 14:
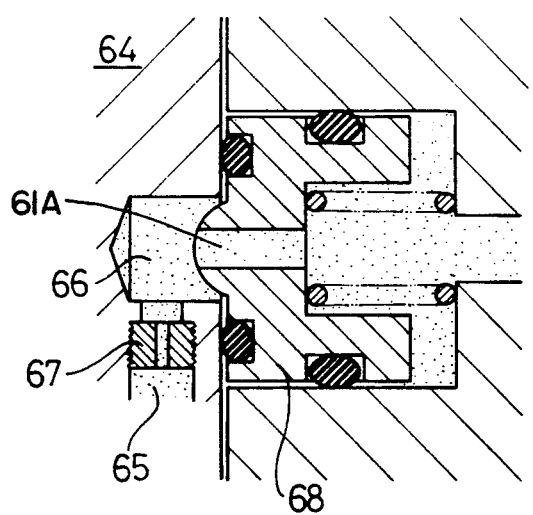
FIG. 14 is an en enlarged-scale view showing a portion indicated by the symbol B shown encircled in FIG. 11.
Figure 15:
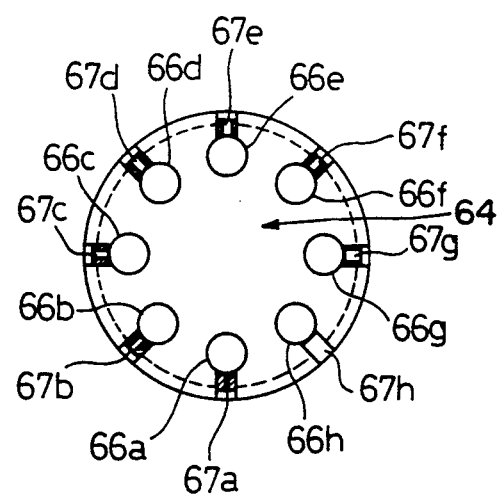
FIG. 15 is a schematic elevational view showing the dialable changeover type orifices of the invention as viewed normal to FIG. 11.
Figure 16:
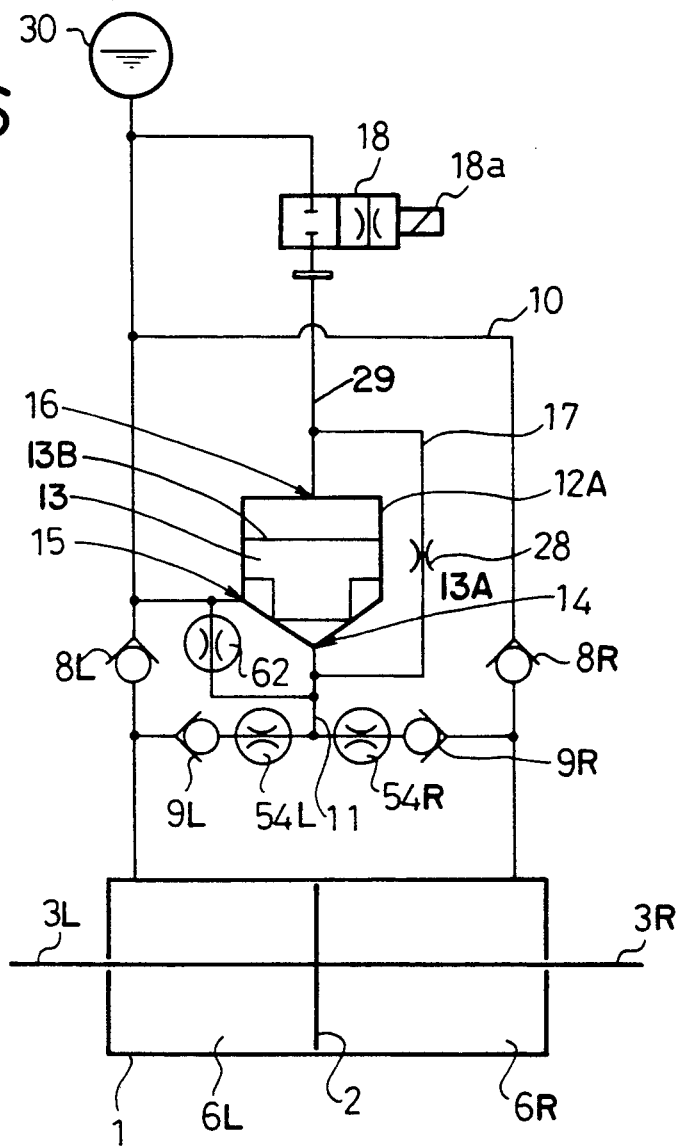
FIG. 16 is a schematic circuit diagram of the hydraulic system of the cylinder lock device shown in FIGS. 8 through 15.
Figure 17:
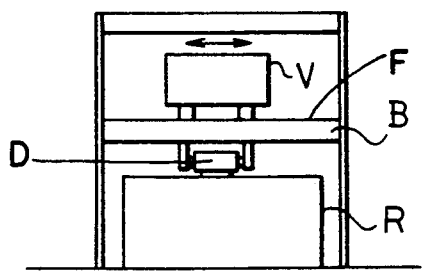
FIGS. 17 and 18 are schematic elevational views of structures which the inventive cylinder lock device is capable of protecting.

FIGS. 8 through 15 show an embodiment of the cylinder lock device according to the present invention, and FIG. 16 is a hydraulic circuit diagram of the embodiment of the invention shown in FIGS. 8 through 15. The left and right-hand parts of the device are identical and are differentiated in the drawings by the letters L and R. When only the part-identifying numeral is referred to in the specification, it is intended that both left and right-hand parts are being described.

Figure 3:
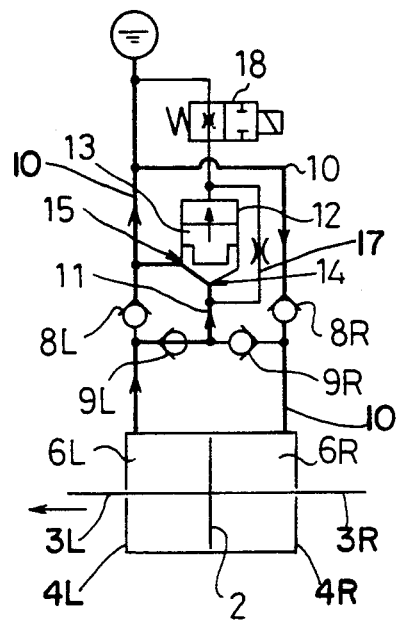
FIGS. 3 through 7 are schematic hydraulic circuit diagrams showing operating conditions of the cylinder lock device of FIG. 1.
Figure 4:
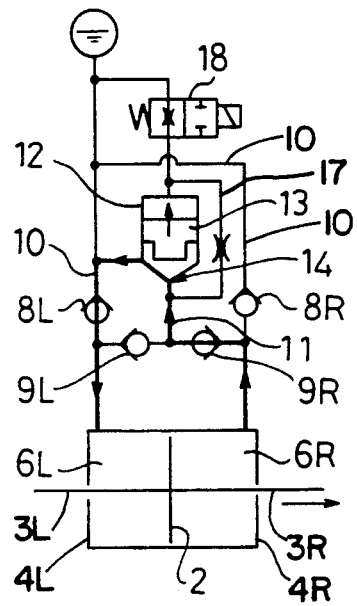
Figure 5:
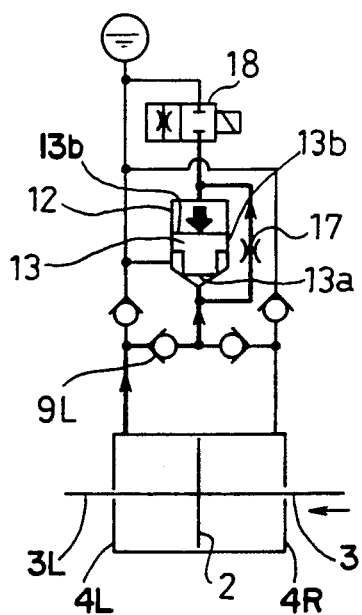
Figure 6:
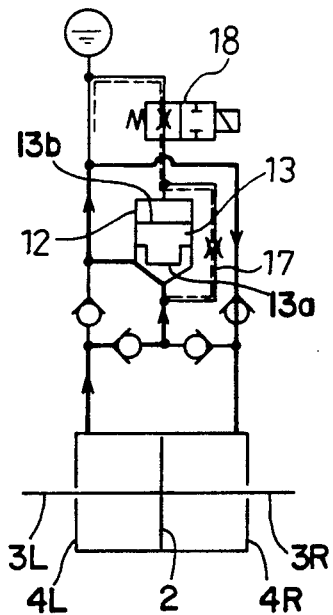
Figure 7:
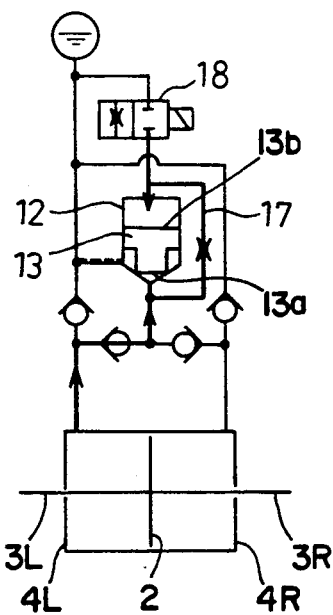
Figure 8:
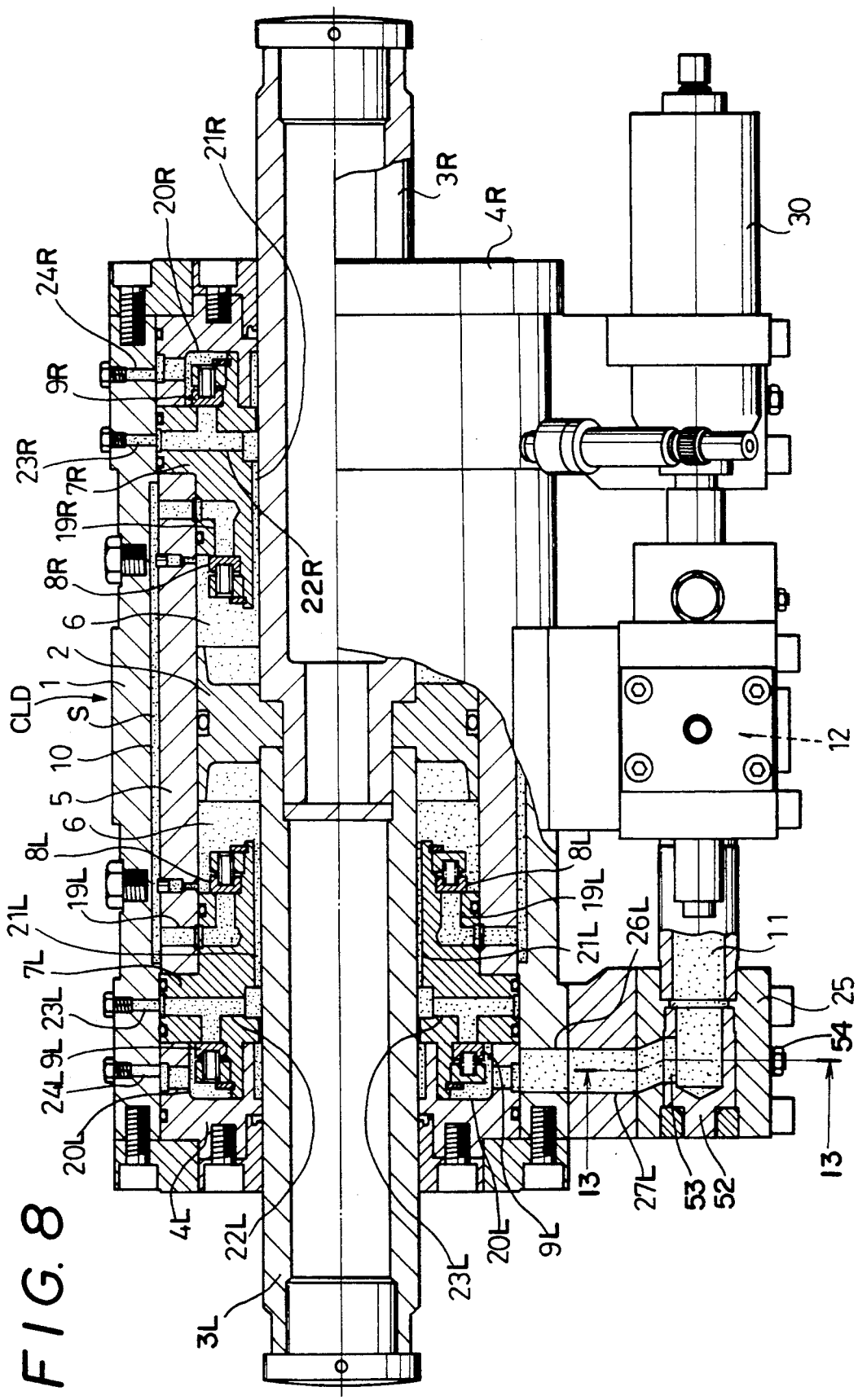
FIG. 8 is a fragmentary sectional plan view of the cylinder lock device according to the present invention.

Referring to FIG. 8, a cylindrical tube 5 is disposed in a cylinder body 1 through an annular space S, and a piston 2 of a double-rod type is slidably inserted into the tube 5 so that each piston rod 3 projects from a side cover plate 4. Each valve body 7 is disposed between a side cover plate 4 and an oil pressure chamber 6. Each valve body 7 is provided at the oil pressure chamber side with an outflow blocking check valve 8 for blocking the outflow of pressurized oil from each oil pressure chamber 6, while the valve body 7 is provided at the cover side with an inflow blocking check valve 9 for blocking the inflow of pressurized oil into each oil pressure chamber 6. The check valves 8 and 9 are arcuately spaced apart in valve body 7.

Each of these check valves 8 and 9 is so structured and positioned in the valve body 7, and is spring biased, so as to permit flow of the pressurized oil in only one direction. Each outflow blocking check valve 8 is communicated to the annular space S defined on the outer periphery of the tube 5 through a communication passage 19, and this annular space S serves as an inflow passage 10 of pressurized oil.

Each inflow blocking check valve 9 is disposed in a receiving groove 20 formed in the side cover plate 4, which is itself composed of a plurality of members, to be communicated to the corresponding oil pressure chambers 6 through an annular groove 21 formed in the inner periphery of the valve body 7 and a communication passage 22.

In order to facilitate the vent of air contained in the oil for use in the cylinder lock device, as shown in FIG. 8, the cylinder body 1 is provided with air vent holes 23 and 24, formed in positions of the cylinder body corresponding to the position of the uppermost inflow blocking check valves 9, whereby the air is capable of venting out of the cylinder body at the position where the air is most likely to collect.

A conduit member 25 is attached to one side of the cylinder body to provide the outflow passage 11 of pressurized oil extending in the axial direction of the piston. This outflow passage 11 is communicated to the receiving grooves 20 of the check valves 9 through communication passages 26 formed in the cylinder body 1 and ports 27 provided at the sides of the attached member 25.

FIGS. 10 and 11 show a portion of a changeover valve 12 provided in the center of the attaching member 25. The changeover valve 12 has a throttle 28 and consists of a cartridge 31 biased by a spring 32. Further, the changeover valve 12 is provided at its lower side with an inlet port 14 and at its right side with an outlet 15 and is so structured that this changeover valve 12 is closed by back pressure and the biasing force of spring 32. The inlet port 14 is communicated to a back pressure port 16 through the throttle 28 (which corresponds to the throttle 28 of the bypass passage 17 in the hydraulic circuit diagram of FIG. 16), and a passage 29 at the side of the back pressure port 16 is provided with a shut-off valve 18. When the shut-off valve 18 is opened, the back pressure is reduced, so that the cartridge 31 is permitted to move upward. The changeover valve 12 is opened to permit the flow of the pressurized oil toward the inflow passage 10 in the cylinder body 1 through a passage 33 (see FIG. 1) extending through the cylinder body 1.

Figure 12:
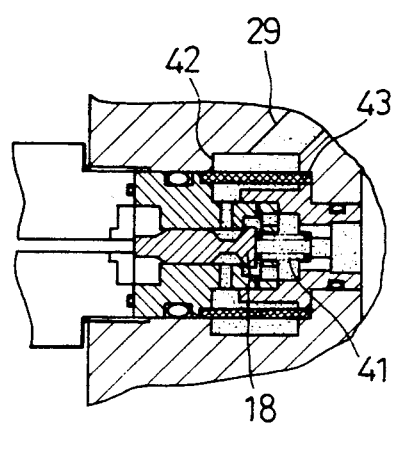
FIG. 12 is an enlarged-scale, fragmentary sectional view showing a portion indicated by the symbol A shown encircled in FIG. 10.

FIG. 12 is an enlarged-scale view showing a portion of the shut-off valve 18 of FIG. 10. The shut-off valve 18 shown in FIG. 12 is a two-position changeover valve which is closed by a solenoid 18a (see the hydraulic circuit diagram of FIG. 16), and returns to the opened condition by the action of a spring 41. This two-position changeover valve is opened and closed at high speed. An expanded diameter portion 42 is provided at the passage 29 extending from the back pressure side of the changeover valve 12 so as to be placed in the neighborhood of the shut-off valve 18. An annular filter 43 is mounted adjacent the expanded diameter portion 42 to prevent the shut-off valve 18 from becoming clogged.

Figure 13:
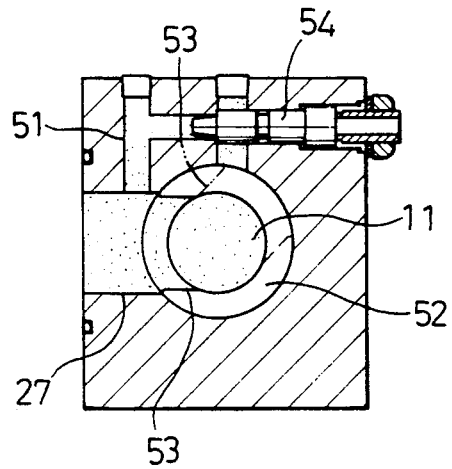
FIG. 13 is a sectional view showing a needle valve provided in an inflow passage of the present invention.

FIG. 13 is a sectional view taken along a line 13—13 of FIG. 8. The passage extending from the port 27 of the attached member 25 to the outflow passage 11 is provided with a bypass passage 51, so that even when the cylinder lock device of the present invention is in the free condition, the cylinder lock device nevertheless has some damping effect. The pressurized oil flows directly from the port 27 into the outflow passage 11 when pipe 52, constituting an end of the outflow passage 11, is rotated about its own axis until hole 53 bored in the side surface of the pipe 52 is aligned with the port 27. When the pipe 52 is rotated to the position shown by the two-dot chain line in FIG. 13, the pressurized oil flows into the outflow passage 11 through the bypass passage 51. This bypass passage 51 is provided with a needle valve 54. As shown in FIG. 13, when the needle valve 54 is advanced into bypass passage 51, the resistance against the inflow of pressurized oil is increased. On the other hand, when the needle valve 54 is pulled back, the resistance against the pressurized oil is reduced. Accordingly, a certain degree of resisting force, that is, the damping effect, is obtainable in the cylinder lock device even in the free condition. It follows, therefore, that the damping property of the cylinder lock device may be adjusted by adjusting the position of the needle valve 54.

Figure 9:
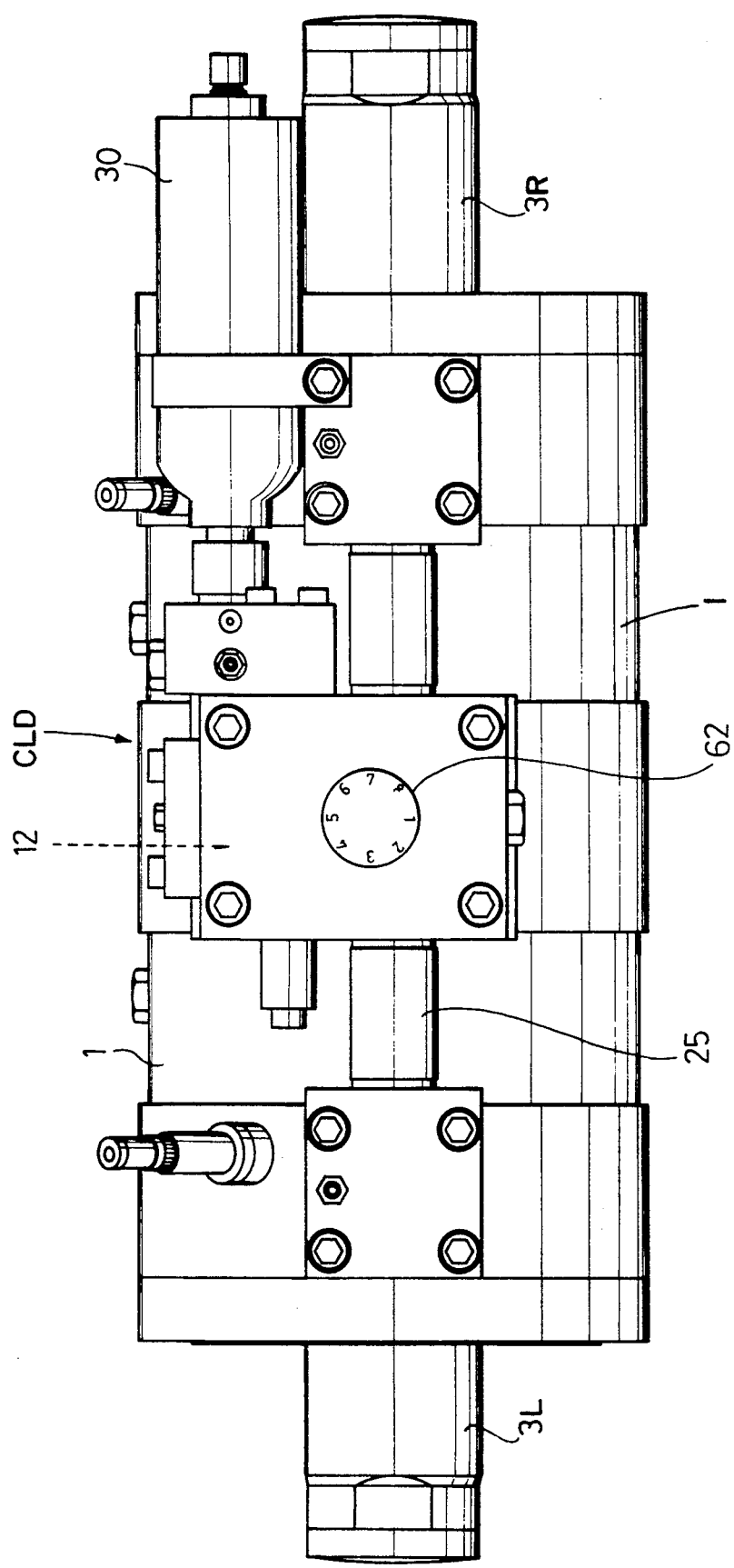
FIG. 9 is an elevational view of the cylinder lock device of FIG. 8, showing the dial means for selecting damping coefficients for the inventive device.

According to this embodiment of the invention, a bypass passage 61 is provided for the changeover valve 12 as shown in FIG. 11, and the resistance in the bypass passage 61 is provided in eight stages by means of dial 62 (see also FIG. 9) so that the damping coefficient of the cylinder lock device even in the locked condition is adjustable to a certain extent. FIGS. 11, 14, and 15 show the dialing system changeover structure in detail. A hand grasping portion 63 of a dial 62, FIG. 11, manually rotated, rotates disc 64 interposed in the bypass passage 61. As shown in FIGS. 11 and 15, eight connection holes 67a through 67h, different from each other in flow resistance, communicate with connecting ports 66a through 66h open to one side of the disc 64. However, as will be noted in FIG. 15, connection hole 67a corresponding to numeral 1 of the dial 62 shown in FIG. 9 is completely closed, and connection hole 67h, corresponding to the numeral 8 of the dial 62, is fully open. Each of the connection ports, 66a through 66h, of the disc 64 is connectable to the outflow passage 11 through passage 61A of connector 68 shown in FIG. 14. Passage 61A constitutes a portion of bypass passage 61.

As shown in FIGS. 8 and 9, an accumulator 30 communicating to the inflow passage 10 is secured to cylinder body 1. This accumulator 30 serves as an oil reservoir for pressurizing the oil in the cylinder to thereby make up oil loss due to leakage, to prevent the oil from mixing with air bubbles, and to compensate for volume change due to change of temperature and compression of oil in oil chambers 6L and 6R.

Figure 18:
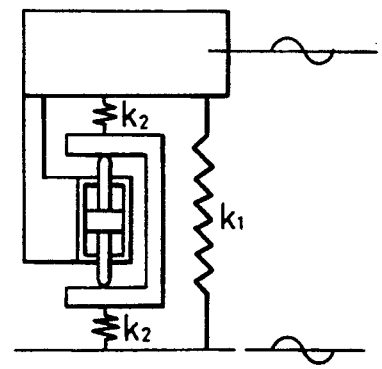

The cylinder lock device used as a machine vibration isolating device is shown in FIG. 18. In this case, when the device is operable, the spring constant $K=K_1+K_2$. When the device is inoperable, the spring constant $K=K_1+K_2/2$.

Figure 19:
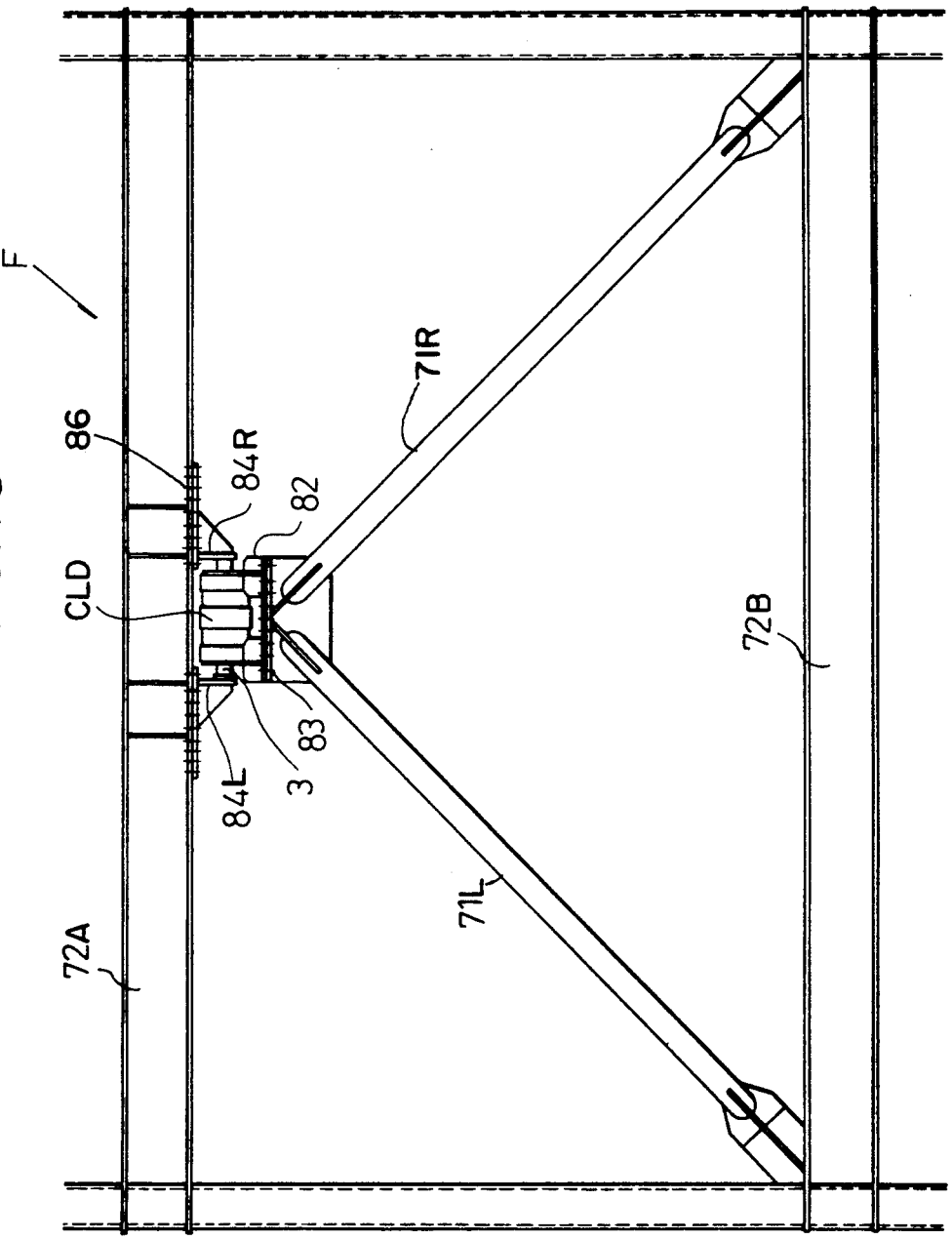
FIG. 19 is an elevational view of a portion of the frame of a building showing a mounting structure of the cylinder lock device secured to the frame according to the present invention.
Figure 20:
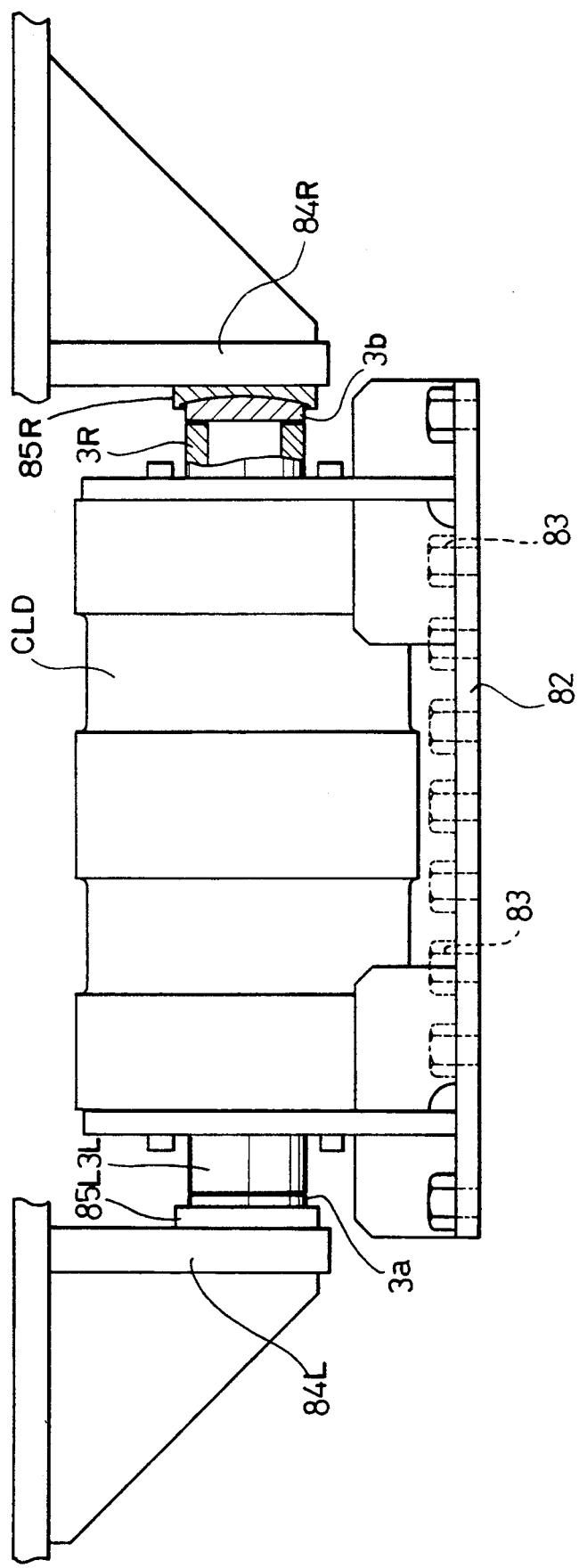
FIG. 20 is an elevational view, partially sectioned, showing the mounting structure of the cylinder lock device according to the present invention.

FIGS. 19 and 20 show the mounting structure of the cylinder lock device according to the present invention. As shown in FIG. 19, a cylinder lock device CLD serving as a variable rigidity device is mounted between vibration-resisting elements 71L and 71R and beam 72A of frame F. So mounted, the CLD is capable of responding to lateral and vertical relative deformation between the beam 72A and the vibration-resisting elements 71 and the centrifugal distortion of the frame F.

A mounting plate 82 is secured to the body of the cylinder lock device CLD, and the cylinder lock device CLD is joined to the braces 71 through mounting plate 82 with bolts 83. The beam 72 is provided with a pair of projecting brackets 84L and 84R, each of which contacts an adjacent head 3a and 3b of the respective piston rods 3L and 3R of the cylinder lock device CLD. As shown in FIG. 20, heads 3a and 3b of the piston rods 3L and 3R are formed into convex arcs of spherical surfaces, each head having its radius of the arc at the center of the body of the cylinder lock device CLD. Low frictional members 85L and 85R, having matching concave spherical seats contacting respective spherical heads 3a and 3b of the piston rods 3L and 3R, are mounted on each of their respective brackets 84L and 84R. The matching spherical surfaces, 3a and 85L and 3b and 85R, permit movement therebetween to compensate for the relative lateral, vertical, and centrifugal distortion of the braces 71 serving as the vibration-resisting elements to the beam 72. Each of the brackets 84, as shown in FIGS. 19 and 20, is joined to a flange of the beam 72 with bolts 86. The surfaces of low frictional members 85 are machine-finished or Teflon-coated, so that the frictional coefficient relative to the heads 3a and 3b of piston rods 3L and 3R is reduced. Thus, the cylinder lock device CLD and the brackets 84 are easily slidable relative to each other.

The foregoing relates to preferred exemplary embodiments of the invention, but it should be understood that other variants and embodiments thereof are possible within the spirit and scope of the invention as defined by the appended claims.

What is claimed is:

1. A cylinder lock device for use in a structure, in which an oil pressure chamber is provided on opposite sides of a piston of a double-rod type in a cylinder body, and the flow of pressurized oil in each oil pressure chamber is controlled by a valve adapted to hold the piston stationary or to render the piston movable, comprising:
   an outflow blocking check valve adapted for blocking the outflow of pressurized oil from each oil pressure chamber;
   an inflow blocking check valve adapted for blocking the inflow of pressurized oil into said each oil pressure chamber;
   an inflow passage provided in and concentric with the said cylinder body and connecting the outflow blocking check valves of both oil pressure chambers to each other;
   an outflow passage provided exterior of the cylinder body and connecting the inflow blocking check valves of both oil pressure chambers to each other; and
   a changeover valve capable of connecting and disconnecting said inflow and outflow passages to and from each other;
   said inflow passage and said outflow passage being connected to each other through said changeover valve, wherein said changeover valve has a valve body provided at one end with an inlet port and an outlet port, and at the other end with a back pressure port, said inlet port and said back pressure port being connected to each other, and said changeover valve being provided at the back pressure port side with a shut-off valve capable of blocking the outflow of pressurized oil.

2. A cylinder lock device for use in a structure according to claim 1, wherein said shut-off valve is a high-speed switch valve and a passage extending from said back pressure port toward said shut-off valve is provided with an expanded diameter portion, said expanded diameter portion being provided with a filter.

3. In a cylinder lock device to protect a building structure from unexpected and uncontrollable seismic shock, in which an oil pressure chamber is provided on opposite sides of a piston in a cylinder body having opposite ends, a piston rod having opposite end portions secured to said piston and extending through said opposite ends of said cylinder body for reciprocal movement therethrough, and the flow of pressurized oil in each oil pressure chamber. is controlled by a valve adapted to hold the piston stationary or to render the piston movable, the improvement comprising:
   an outflow blocking check valve adapted for blocking the outflow of pressurized oil from each oil pressure chamber;
   an inflow blocking check valve adapted for blocking the inflow of pressurized oil into said each oil pressure chamber;
   an inflow passage provided in and concentric with the said cylinder body and connecting the outflow blocking check valves of both oil pressure chambers to each other;
   an outflow passage provided exterior of the cylinder body and connecting the inflow blocking check valves of both oil pressure chambers to each other; and
   a changeover valve capable of connecting and disconnecting said inflow and outflow passages to and from each other;
   said inflow passage and said outflow passage being connected to each other through said changeover valve; said changeover valve having a valve body provided at one end with an inlet port and an outlet port, and at the other end with a back pressure port, said inlet port and said back pressure port being connected to each other, and said changeover valve being provided at the back pressure port side with a shut-off valve cable of blocking the out flow of pressurized oil; one of said piston rod opposite ends being secured to a first portion of a building structure and the other of said opposite ends being secured to a second portion of said building structure, said piston rod being adapted to receive seismic vibrations through said building structure to reciprocate said piston.

4. The cylinder lock device of claim 3, including a pair of brackets secured to a building structure and spaced apart to receive said piston rod therebetween.

5. The cylinder lock device of claim 4, wherein said piston rod opposite end portions are formed with convex arcs of spherical low frictional surfaces and said brackets are provided with pads formed with concave arcs of spherical low frictional surfaces adapted to receive adjacent end portions in sliding contact therewith.

6. The cylinder lock device of claim 5, wherein said low frictional surfaces are Teflon-coated.

7. The cylinder lock device of claim 5, wherein said low frictional surfaces are obtained by machine finishing.

8. The cylinder lock device of claim 3, wherein said inflow passage is defined by an annular space formed between said cylinder body and a tube provided concentrically within said cylinder body.

9. The cylinder lock device of claim 8, wherein a plurality of said outflow blocking check valves are annularly disposed within said tube of said cylinder body at predetermined intervals.

10. The cylinder lock device of claim 3, wherein said outflow passage is defined in an attaching member provided on one side of the cylinder body and exterior thereof and extending between said oil pressure chambers of said cylinder body.

11. The cylinder lock device of claim 3, wherein either said inflow passage or said outflow passage is provided with an accumulator.

12. The cylinder lock device of claim 3, wherein a bypass passage varying the flow resistance is provided for said changeover valve, and the flow resistance of said bypass passage relative to said changeover valve, when closed, is varied to vary the damping coefficient of the cylinder lock device.

13. The cylinder lock device of claim 3, wherein said outflow passage is provided with a bypass passage and a needle valve in said bypass passage adapted to vary flow resistance in said outflow passage wherein a bypass passage varying the flow resistance is provided for said changeover valve, and the flow resistance of said bypass passage relative to said changeover valve, when closed, is variable to vary the damping coefficient of the cylinder lock device.

14. The cylinder lock device of claim 13, wherein a bypass passage varying the flow resistance is provided for said changeover valve, and the flow resistance of said bypass passage relative to said changeover valve, when closed, is varied by vary the damping coefficient of the cylinder lock device.

15. The cylinder lock device of claim 3, including bypass means to bypass said changeover valve when said changeover valve is closed; metering means to meter oil through said bypass means; means to vary the capacity of said metering means in digital increments; dial means; and means to selectively dial said dial means to select a digital increment of metering capacity, said dial means comprising a rotatable dial adapted to sequentially index a series of bypass restrictors into the path of oil flowing to said bypass means, said bypass resistors being adapted to restrict the flow of oil through said bypass means.

16. The cylinder lock device of claim 15, said bypass resistors acting to modify the coefficient of damping of said cylinder lock device, wherein said dial means are adapted to be manually operable and said bypass restrictors are adapted to provide a range of bypass restrictions from fully closed to fully open.

* * * * *